United States Patent [19]

Brink

[11] Patent Number: 5,998,505
[45] Date of Patent: Dec. 7, 1999

[54] THERMOPLASTIC ELASTOMERIC COMPOSITIONS AND FILMS FORMED THEREFROM HAVING IMPROVED MOISTURE VAPOR TRANSMISSION RATES

[75] Inventor: Mary Heather Brink, Johnson City, Tenn.

[73] Assignee: Eastman Chemical Company, Kingsport, Tenn.

[21] Appl. No.: 08/974,694

[22] Filed: Nov. 20, 1997

Related U.S. Application Data

[60] Provisional application No. 60/031,503, Nov. 27, 1996.

[51] Int. Cl.$^6$ ........................................................ C08J 9/32
[52] U.S. Cl. ............................................ 523/218; 524/450
[58] Field of Search .............................. 523/218; 524/450

[56] References Cited

U.S. PATENT DOCUMENTS

| | | |
|---|---|---|
| 3,844,865 | 10/1974 | Elton et al. . |
| 4,285,751 | 8/1981 | Feinberg ................................. 524/505 |
| 4,464,504 | 8/1984 | Kocsis .................................... 524/443 |
| 4,483,958 | 11/1984 | Kosaka ................................... 524/409 |
| 4,613,643 | 9/1986 | Nakamura ............................... 524/570 |
| 4,626,252 | 12/1986 | Nishizawa et al. . |
| 4,780,498 | 10/1988 | Goerrissen .............................. 524/590 |
| 4,847,145 | 7/1989 | Matsui . |
| 4,973,606 | 11/1990 | Sterzel ................................... 521/27 |
| 5,073,316 | 12/1991 | Bizen et al. . |
| 5,393,329 | 2/1995 | Inagaki .................................. 96/131 |
| 5,556,699 | 9/1996 | Niira .................................... 523/122 |

FOREIGN PATENT DOCUMENTS 0 492 942 A2  7/1992  European Pat. Off. .

OTHER PUBLICATIONS

Database WPI, Section Ch, Week 9627, Derwent Publications Ltd., London, GB; Class A60, AN 96–262457, XP002061242 & JP 07 292 576 A (Unitika Ltd), Nov. 7, 1995, see abstract.

S. S. Steinsinger et al., "Encyclopedia of Chemical Technology," 3$^{rd}$ edition, 2d, H. F. Mark et al., Wiley Interscience, New York, 1978, vol. 3, p. 482.

J. Crank et al., "Diffusion in Polymers," Academic Press, New York, 1968, pp. 200–203.

*Primary Examiner*—Paul R. Michl
*Attorney, Agent, or Firm*—Bernard J. Graves, Jr.; Andrew B. Griffis; Harry J. Gwinnell

[57] ABSTRACT

The invention relates to novel compositions comprising thermoplastic elastomers and microporous inorganic fillers, and novel continuous, non-porous films formed therefrom which are impermeable to blood and preferably have enhanced moisture vapor transmission rates (MVTR).

34 Claims, No Drawings

THERMOPLASTIC ELASTOMERIC COMPOSITIONS AND FILMS FORMED THEREFROM HAVING IMPROVED MOISTURE VAPOR TRANSMISSION RATES

CROSS-REFERENCE TO RELATED APPLICATIONS

This Application claims the benefit of Provisional Application Ser. No. 60/031,503, filed Nov. 27, 1996.

FIELD OF THE INVENTION

This invention relates to new and useful thermoplastic elastomeric compositions and films produced therefrom.

BACKGROUND OF THE INVENTION

A major consideration in the comfort of a garment is its ability to maintain a balance between heat production and heat loss. The loss of heat through clothing may occur through direct dry heat loss or by moisture evaporation. In respect to the latter, the moisture vapor transmission rate of the material utilized in forming the garment is generally related to the breathability of the material. Breathability is the ability to diffuse moisture/water vapor through a film or garment. In addition to this property, there are many applications requiring that the material used in preparing the garment be impermeable to a liquid. Such applications include diaper back sheets, sanitary napkins, medical protective garments, surgical incise drapes, transdermal patches, wound care bandages and dressings, intravenous site dressings and ostomy site dressings, among others.

Films which are permeable to water vapor and are porous but yet are intended to be impermeable to a liquid are described in U.S. Pat. Nos. 4,626,252 and 5,073,316. As disclosed, a porous film is obtained by mixing a polyolefin resin, an inorganic filler and a plasticizer; forming a film from the mixture; and uniaxially or biaxially stretching the film. However, a drawback of this prior art is that during the process of stretching the film to render them permeable to water vapor, certain disadvantages arise, such as reduced mechanical properties and/or microvoids (holes that may permit viral/disease transmission).

The use of certain inert non-microporous inorganic fillers are disclosed in S. S. Steingiser, S. P. Nemphos, and M. Salame, "Encyclopedia of Chemical Technology," 3rd Edition, 2d, H. F. Mark et al., Wiley Interscience, New York, 1978, Vol. 3, p. 482, and J. Crank and G. S. Park, "Diffusion in Polymers," Academic Press, New York, 1968, pp. 200–203).

Thus, it would be very desirable to produce continuous, non-porous films that have improved moisture vapor transmission rates (MVTR) but that are impermeable to liquids, such as blood, without any necessity for stretching of the film.

SUMMARY OF THE INVENTION

The present inventor has surprisingly discovered new and useful thermoplastic elastomeric compositions and films produced therefrom. The compositions and films are useful in many applications, such as garments, and are particularly useful in applications, such as medical garments, requiring the properties of both improved moisture vapor transmission rate and impermeability to liquids, such as blood, The compositions comprise:

(i) a thermoplastic elastomer, a film of which has a moisture vapor transmission rate (MVTR) of at least equal to or greater than 200 g mil/m$^2$ day, as determined by the procedure hereinafter described in detail; and (ii) a microporous inorganic filler, present in an effective amount, such that a film formed from said thermoplastic elastomer composition has an MVTR exceeding the MVTR of a film formed from said thermoplastic elastomer by itself. This amount is preferably least equal to or greater than 10%, by weight, based on the total weight of the resultant thermoplastic elastomeric composition.

In addition to the novel thermoplastic elastomeric compositions, the present invention is also directed to continuous, non-porous films formed from the novel thermoplastic elastomeric compositions that are characterized preferably by having increased moisture vapor transmission rates when compared to a film produced from the thermoplastic elastomer in the absence of the microporous filler and are impermeable to liquids, such as blood, and air-borne pathogens, and a process for preparing the films.

Additionally, the present invention is directed to articles of manufacture incorporating the novel compositions and novel films, of the present invention.

Accordingly, it is an object of the present invention to provide novel thermoplastic elastomeric compositions comprising certain thermoplastic elastomers and certain inorganic fillers.

It is a further object of this invention to provide novel continuous, non-porous films formed from novel thermoplastic elastomeric compositions comprising certain thermoplastic elastomers and certain inorganic fillers, and a process for producing the novel films.

A still further object of this invention is to provide novel continuous, non-porous films having increased moisture vapor transmission rates and impermeability to blood, and a process for producing the novel films.

A still further object of this invention is to provide articles of manufacture, such as garments, diapers, sanitary napkins, medical protective garments, surgical incise drapes, transdermal patches, wound care bandages and dressings, intravenous site dressings, and ostomy site dressings, and others, incorporating the novel thermoplastic compositions and films of the present invention.

These and other objects, features, and advantages of this invention will become apparent as reference is made to the following detailed description, preferred embodiments, specific examples, and claims.

DESCRIPTION OF THE PREFERRED EMBODIMENTS

It has surprisingly been found that compositions comprising a thermoplastic elastomer, a film of which has a moisture vapor transmission rate of at least equal to, or greater than, 200 g mil/m2 day, more preferably 500 g mil/m$^2$ and a sufficient amount of a microporous inorganic filler, will provide novel thermoplastic elastomeric compositions that can be formed into continuous, non-porous films having increased moisture vapor transmission rates (MVTR) when compared to films formed from the thermoplastic elastomer in the absence of filler, without the necessity of stretching the film.

The films formed from the microporous inorganic filler-containing compositions have improved breathability since increased MVTR is generally related to the breathability of the film. Moreover, visual and physical observation of the films reveals that the hand of the films containing the microporous inorganic filler is also enhanced. Furthermore, the physical properties of the resultant microporous inorganic filler—containing film are not detrimentally affected as a result of incorporating the filler. The films preferably have a thickness of about one-half (½) to about 2 mils (1 mil=1/1000 inch=25.4 microns). The novel resultant film is also impermeable to liquids, such as blood. For many purposes, it may be desirable to blend other conventional additives with the thermoplastic elastomeric compositions of the present invention.

Articles of manufacture, exemplified but not limited by articles such as garments, diaper back sheets, sanitary napkins, medical protective garments, surgical incise drapes, transdermal patches, wound care bandages and dressings, intravenous site dressings, and ostomy site dressings, and the like, can be produced from the novel compositions and novel films of the present invention utilizing any suitable techniques for producing such articles. Preferred techniques include blown films, melt cast and film extrusion, the latter including extrusion onto a substrate. Such a substrate, depending on its composition and/or the composition of the thermoplastic elastomeric composition, may also include a tie-layer. Preferred substrates include woven and nonwoven fabrics. Films produced by melt casting or blowing can be thermally bonded or sealed to a substrate using an adhesive. The ordinary artisan, in possession of the present disclosure, can prepare such films and articles containing such films without undue experimentation.

The film produced from the composition of the present invention is preferably a continuous, non-porous film. This means that, while having good MVTR, the film does not have physical voids or pores through which particles can pass, and are thus impermeable to liquids, such as blood and other body fluids.

The microporous inorganic filler is present in a sufficient amount, meaning an amount that provides an increase in the MVTR of the resulting film over a film of the same material not having inorganic filler. This may vary depending on the thermoplastic elastomer selected and on the microporous inorganic filler used therein. The amount can be as little as 5 weight percent or even less, based on the total weight of the thermoplastic elastomeric composition, however using lower amounts results in the improvement in MVTR also being low. The amount of microporous inorganic filler is preferably of at least 10%, or more, by weight, based on the total weight of the resultant thermoplastic elastomeric composition. However, it is more preferred to use from about 15% to about 60% by weight, of the microporous inorganic filler, based on the total weight of the resultant composition. Still further preferred is to use an amount of microporous inorganic filler ranging from about 15% to about 40%, by weight, based on the total weight of the resultant composition, with the most preferred amount of microporous inorganic filler ranging from about 25% to about 35%, by weight, based on the total weight of the resultant composition.

There is no real lower limit to the amount of the filler that can be present in the composition, but as the amount of filler incorporated is lowered the effect on increasing MVTR property is reduced until no increase in MVTR is noted, when compared to a film formed from the thermoplastic elastomer in the absence of the filler. In addition to increasing the MVTR of the resulting film, higher amounts of the filler provide other benefits as well, such as good chill roll release. When the filler is present in the composition in lower amounts, i.e., near 5% or lower, the film sticks to the chill roll during extrusion and forms a poor film, unless an additional chill roll release agent is used. Thus, particularly when used in an extrusion process using a chill roll, the amount of microporous inorganic material used is preferably higher than 5% by weight, based on the total composition.

Microporous inorganic filler is used in preparing the novel thermoplastic elastomeric composition preferably in a sufficient amount such that a film formed from the resultant composition will have a MVTR value increased relative to that of a film formed from the thermoplastic elastomer in the absence of the filler. It has further been determined that as the amount of filler material is increased in the composition, the MVTR of the film is increased and, as such, there is no clear upper limit to the amount of filler to be incorporated. However, as the filler content is increased to levels greater than 60%, by weight, mechanical properties of the film may deteriorate. Consequently, the upper limit of filler is dependent upon obtaining an optimum balance of all important film properties depending upon the application for which the film is intended. In some cases it may be that the strength properties of the film are not important, so that large amounts (i.e., greater than 60 weight percent) of microporous inorganic filler can be used. It would be a matter of routine experimentation for the ordinary artisan, in possession of the present disclosure, to determine the optimum amount of microporous inorganic filler regarding the balance of desired MVTR and mechanical properties of the resultant film.

The fillers useful in preparing the novel thermoplastic elastomeric compositions of this invention include any microporous inorganic filler material. Microporous, as used herein, refers to a material that has pores, preferably of about 2 to about 50 Angstrom size, that form a continuously interconnecting void space or network.

Examples of microporous inorganic filler materials suitable for use with this invention include microporous silicas and molecular sieves such as zeolites, activated clays, activated carbons and gels, typified by silica gel or activated alumina. The more preferred fillers are zeolites. In the present compositions, the microporous inorganic materials function unexpectedly to increase MVTR, as well as functioning as normal fillers.

In general, zeolites are natural or synthetic, highly polar, crystalline aluminosilicate materials. For further examples of zeolites suitable for use herein, reference is made to the zeolites described by D. W. Breck, "Zeolite Molecular Sieves," Wiley Interscience, 1984, pages 133 to 180. While any zeolite can be used herein, it is preferred to utilize a zeolite having an average particle size of about 2 to about 10 microns, more preferably of about 2 to about 3 microns. Zeolites having an average particle size below 2 microns are not readily commercially available, but are useful in the present invention. Zeolites having average particle sizes exceeding about 10 microns similarly enhance the MVTR of the films herein, but could cause deterioration of the mechanical properties of the film.

It is preferred that the zeolite utilized herein have a pore size of about 3 to about 10 Angstroms, most preferably about 4 Angstroms. Pore sizes below 3 Angstroms are of a size through which it is difficult for water to pass. Zeolite having a pore size of greater than 10 Angstroms are not readily commercially available, but are useful in the present invention.

In an especially preferred embodiment, the zeolite utilized herein has a pore size of about 4 Angstroms and a particle size of about 2 to about 3 microns.

Zeolites may be obtained in a form in which water molecules are absorbed on the surface as well as within the core of the zeolite particles. Dehydrated zeolites may also be obtained, which have undergone a process to remove the majority of absorbed water, e.g., wherein less than 5 weight percent water is present within the dehydrated zeolite. The amount of water absorbed by the zeolite will affect the MVTR. At the same concentration of zeolite, the dehydrated zeolite provides a higher MVTR than the hydrated zeolite. It has been found that films produced from the dehydrated zeolite blends have about a 10% reduction in mechanical properties compared to films produced from the hydrated zeolite blends. Furthermore, it has been found that during compounding, as described hereinbelow, the water present in the hydrated zeolite is devolatilized and must be removed from the compounding equipment (e.g., extruder) to prevent pressure buildup and maintain the molecular weight of the polymeric base material. The dehydrated zeolite provides the advantage of not producing as much devolatilized water during compounding.

The elastomers useful in preparing the novel compositions and films of this invention include any thermoplastic elastomer, a film of which is characterized by having a moisture vapor transmission rate (MVTR), as determined in accordance with the test procedure described herein, at least equal to, or greater than, 200 g mil/m$^2$ day (about 5000 g $\mu$m/m$^2$ day), meaning that during a 24 hour period at least 200 g of water vapor will pass through each square meter of film that is one thousandth of an inch thick.

As used herein, thermoplastic elastomer refers to polymeric materials that elongate and have less than 100% recovery. Examples of thermoplastic elastomers suitable for use with this invention include, among others, any copolyester, polyamides such as polyether amide, polyurethanes such as polyester ether urethane, or other elastomers, a film of which has a MVTR of at least equal to, or greater than, 200 g mil/m2 day, preferably equal to or greater than 300 g mil/m2 day.

Surprisingly, it has also been unexpectedly discovered that certain polymeric materials are not benefited by an increase in the MVTR when the microporous inorganic filler is incorporated therein. These polymeric materials are those that do not have a good MVTR when formed into a film consisting essentially of the polymeric material. When a polyolefin having a MVTR of 45 g $\mu$m/m$^2$ day was blended with zeolites, no significant improvement in the MVTR of the film can be obtained without microvoiding.

In a more preferred embodiment, the composition according to the present invention comprises, in addition to the microporous inorganic filler, thermoplastic elastomeric copolyesters, films of which have a MVTR of at least equal to, or greater than, 200 g mil/m2 day, more preferably 300 g mil/m2 day. The copolyesters are more preferably step-growth polymerization products of at least one, or more, aromatic dicarboxylic acids (or esters thereof), and/or at least one, or more aliphatic dicarboxylic acids (or esters thereof), and at least one, or more diols as further specified hereinafter. Combinations of the aforementioned dicarboxylic acids and their esters may also be used. Preferred esters are C1–C4 esters, more preferably methyl or ethyl esters of the aforementioned dicarboxylic acids, with methyl being most preferred.

The total mole % of monomers comprising the thermoplastic copolyesters is based on 200%, wherein the total mole % of aromatic and/or aliphatic dicarboxylic acid(s) (or esters thereof, or combinations of the esters and acids, as described previously) equals 100%, and the total mole % of diol(s) equals approximately 100%. In an even more preferred embodiment, aliphatic dicarboxylic acids having from about 2 to about 12 carbon atoms are used, such as oxalic, malonic, succinic, glutaric, adipic, sebacic, azelaic, pimelic, suberic, diglycolic, 2,2-dimethyl glutaric, 1,3-cyclopentanedicarboxylic, 1,4-cyclohexanedicarboxylic (including cis-, trans-, or cis/trans mixtures of the isomers), 1,12-dodecanedicarboxylic, 2,5-norbornanedicarboxylic, ester forming derivatives of these aliphatic dicarboxylic acids, and combinations or mixtures thereof. Also more preferably used herein are aromatic dicarboxylic acids having from about 8 to about 16 carbon atoms, including 1,3-terephthalic, 1,4-terephthalic, 2,6-naphthalene, 1,5-naphthalene, 1,3-phenylenedioxydiacetic, ester forming derivatives of these aromatic dicarboxylic acids, and combinations or mixtures thereof.

Preferred diols are aliphatic diols, even more preferably aliphatic diols having from 4 to about 12 carbon atoms; mixtures of diols can also be used. Examples of preferred diols include neopentyl glycol, 1,4-butanediol, 1,3-butanediol, 1,4-pentanediol, 1,5-pentanediol, 1,6-hexanediol, 1,10-decanediol, 2,2,4-trimethyl-1,6-hexanediol, 1,3-cyclohexanedimethanol, 1,4-cyclohexanedimethanol, and 2,2,4,4-tetramethyl-1,3-cyclobutanediol. The aliphatic diol utilized may optionally contain a small amount of an aliphatic diol (i.e., up to about 25 mole percent, more preferably 1% to 25%, based on 100 mole percent of diol) having from 2 to 3 carbon atoms, such as ethylene glycol or propylene glycol.

In another preferred embodiment, the diol component of the copolyester may be a polyalkylene ether compound of the formula:

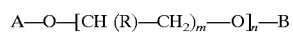

wherein, m is an integer from 1 to 3;

n is an integer from 4 to 250;

R is selected from the group consisting of CH$_3$, C$_3$H$_7$, C$_2$H$_5$, H, and mixtures thereof;

A is hydrogen, or alkyl, acyl, aryl or aroyl moieties having from 1 to 10 carbon atoms; and B is hydrogen, or alkyl, acyl, aryl or aroyl moieties having from 1 to 10 carbon atoms.

Preferable polyalkylene ethers are poly(ethylene glycol), poly (propylene glycol), and poly (tetramethylene glycol). The preferred polyalkylene ether is poly(ethylene glycol). Moreover, the polyalkylene ether preferably has a number average molecular weight from about 200 to about 10,000, with a more preferred number average molecular weight ranging from about 400 to about 1,500.

In respect to the foregoing dicarboxylic acids and diols useful in preparing the thermoplastic copolyesters suitable for use herein, the following are preferred:

(a) the preferred aromatic dicarboxylic acids are terephthalic acid, isophthalic acid, and naphthalenedicarboxylic acid;

(b) the preferred aliphatic dicarboxylic acids are adipic acid, glutaric acid and cyclohexanoic acid;

(c) the preferred diols are 1,4-butanediol, cyclohexanedimethanol and a polyalkylene ether compound of the above formula.

Mixtures of the preferred dicarboxylic acids can be utilized, and mixtures of the preferred diols may be utilized, in preparing the copolyesters herein.

Specific examples of thermoplastic copolyesters from which are formed films having moisture vapor transmission rates of at least equal to, or greater than, 200 g mil/m² day and, as such, are useful in the present invention include the following:

a. copolyesters prepared from a cyclic aliphatic dicarboxylic acid, a cyclic aliphatic diol, as described herein, and at least about 9 mole % (based on total diol) of a polyalkylene ether of the formula described hereinabove. Exemplary of this type is a copolyester of about 100 mole % 1,4-cyclohexanedicarboxylic acid, about 90 mole % 1,4-cyclohexanedimethanol and about 10 mole % polytetramethylene glycol;

b. copolyesters prepared from at least one or more aromatic dicarboxylic acids, butanediol and a polyalkylene ether of the formula described hereinabove. Exemplary of this type is a copolyester of about 70–100 mole % terephthalic acid, about 15–95 mole % butanediol and about 85–5 mole % of a polyalkylene ether, as described above, optionally containing an amount of up to 30 mole percent isophthalic acid. Also exemplary of this type is a copolyester of poly(butylene naphthalate) containing a polyalkylene ether, as defined above, such as a copolyester comprising 100 mole % 2,6-naphthalenedicarboxylic acid, 40–90 mole % 1,4-butanediol, and 10–60 mole % polyethylene glycol;

c. a copolyester prepared from at least two, or more, aliphatic dicarboxylic acids and butanediol. Exemplary of this type is a poly(butylene succinate-co-butylene glutarate) copolyester such as a copolyester of poly(butylene succinate) containing about 20 to about 30 mole percent glutaric acid. The copolyesters comprise about 100 mole % butanediol, about 70–80 mole % succinic acid, and about 20–30 mole % glutaric acid;

d. copolyesters prepared from an aromatic dicarboxylic acid, a polyalkylene ether as described herein, and at least one, or more, aliphatic diols having 4 to 12 carbon atoms. Exemplary of this type copolyesters are poly (ethylene terephthalate) containing 30 mole percent, or more, of a polyalkylene ether of the formula described hereinabove; and poly(cyclohexanedimethylene terephthalate) containing 10 mole percent, or more, of a polyalkylene ether of the formula described hereinabove. Exemplary copolyesters comprise about 100 mole % terephthalic acid, about 30–70 mole % ethylene glycol and about 30–70 mole % of said polyalkylene ether; and about 100 mole % terephthalic acid, about 20–90 mole % cyclohexanedimethanol, and about 10–80 mole % of said polyalkylene ether;

e. copolyesters prepared from an aliphatic dicarboxylic acid, an aromatic dicarboxylic acid, and an aliphatic diol, having from 4 to about 12 carbon atoms, such as butanediol or mixtures thereof, optionally containing up to about 25 mole % of an aliphatic diol having from 2 to 3 carbon atoms, such as ethylene glycol and propylene glycol. Exemplary of such aliphatic-aromatic copolyesters that are useful in the present invention are essentially linear, random copolymers and preferably comprise repeating units of:

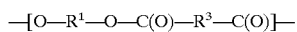

and

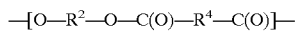

wherein $R^1$ and $R^2$ can be the same or different and are selected from the group consisting of C2–C8 alkylenes or C2–C8 oxyalkylenes; $R^3$ is selected from the group consisting of C1–C8 alkylenes, C2–C4 oxyalkylenes, and mixtures thereof, and wherein the mole % of $R^3$ is about 95–35%, preferably from about 80 to 35%; and $R^4$ is selected from one or more aryl-containing groups, preferably C6–C10 aryls, and wherein the mole % of $R^4$ is from about 5–65%. More preferred are those copolyesters wherein $R^1$ and $R^2$ are the same and are selected from C2–C4 alkylenes; $R^3$ is selected from one or more of the group consisting of C2–C6 alkylenes or C2 oxyalkylenes, and the mole % of $R^3$ is about 95–40%; R4 is 1,4-disubstituted C6 aryl, and the mole % of $R^4$ is about 5–60%. The most preferred compositions for these copolyesters are those prepared from the following diols and dicarboxylic acids (or polyester forming derivatives thereof) in the following mole %:

(a) glutaric acid (30–65%); diglycolic acid (0–10 mole %); terephthalic acid (25–60%); 1,4-butanediol (100 mole %);

(b) succinic acid (30–85%); diglycolic acid (0–10%); terephthalic acid (5–60%); 1,4-butanediol (100 mole %);

(c) adipic acid (30–65%); diglycolic acid (0–10%); terephthalic acid (25–60%); 1,4-butanediol (100 mole %).

Specific examples of preferred copolyesters include poly (tetramethylene glutarate-co-terephthalate-co-diglycolate) [50/45/5], poly(tetramethylene glutarate-co-terephthalate) [50/50], poly(tetramethylene glutarate-co-terephthalate) [60/40], poly(tetramethylene glutarate-co-terephthalate) [40/60], poly(tetramethylene succinate-co-terephthalate) [85/15], poly(ethylene succinate-co-terephthalate) [70/30], poly(tetramethylene adipate-co-terephthalate) [85/15], and poly(tetramethylene succinate-co-terephthalate) [70/30].

Exemplary further of this preferred type of aliphatic-aromatic copolyester are those based on aliphatic dicarboxylic acids having about 4 to about 10 carbon atoms and containing from about 30 to about 70 mole percent of at least one, or more, aromatic dicarboxylic acids having about 8 to about 16 carbon atoms. More specifically, a suitable copolyester of this type is a poly(butylene glutarate-co-butylene terephthalate) such as a poly(butylene glutarate) containing from about 40 to about 60 mole percent of terephthalic acid. A more preferred exemplary copolyester of this type is a poly(butylene adipate-co-butylene terephthalate) and more preferably a copolyester of poly(butylene adipate) containing from about 40 to about 60 mole percent of terephthalic acid.

In a still more preferred embodiment, the copolyester is poly(butylene adipate) containing about 41–44 mole percent of terephthalic acid, having an inherent viscosity of about 1.10 dl/g. Inherent viscosity as used herein is measured at a temperature of 25° C. for a 0.5 g sample in 100 ml of a 60/40 parts by weight solution of phenol/tetrachloroethane.

Further examples of commercially available thermoplastic copolyesters useful in the present invention include the HYTREL® polymers available from DuPont Chemical Company, which are thermoplastic copolyesters containing as the diol moiety poly(ethylene glycol), poly(propylene glycol), poly(tetramethylene glycol), and mixtures thereof.

The thermoplastic copolyesters suitable for use with the present invention preferably have an inherent viscosity of about 0.5 to about 1.8 deciliters/gram (dl/g), as measured at a temperature of 25° C. for a 0.5 g sample in 100 ml of a 60/40 parts by weight solution of phenol/tetrachloroethane. Films having an inherent viscosity below about 0.5 dl/g tend to have poor mechanical properties. Films having an inherent viscosity above about 1.8 dl/g tend to be difficult to process.

The copolyesters of the present invention are readily prepared by methods well known in the art, for example, as described in U.S. Pat. No. 2,012,267. The reactions for preparing the copolyesters are preferably carried out at temperatures of about 150° C. to about 300° C. in the presence of polycondensation catalysts such as titanium tetrachloride, manganese diacetate, antimony oxide, dibutyl tin diacetate, zinc chloride, or combinations thereof. The catalysts are typically employed in amounts of 10 to 1000 ppm, based on total weight of the reactants.

The novel thermoplastic elastomeric compositions comprising the microporous inorganic fillers and the thermoplastic elastomers can be prepared utilizing any conventional method, and the novel films can be formed from the resultant thermoplastic elastomeric compositions utilizing any means known in the art. For example, the thermoplastic elastomeric compositions can be prepared in an apparatus such as a torque rheometer, a single screw extruder, or a twin screw extruder. Formation of films from the resulting compositions can be achieved by melt extrusion, as described, for example, in U.S. Pat. No. 4,880,592, or by compression molding as described, for example, in U.S. Pat. No. 4,427,614, or by any other suitable method. Although any method can be used for preparing the composition according to the present invention, it is preferred that the thermoplastic elastomeric material and the microporous inorganic material be blended at a temperature of about 25 to 50° C. above the melting point (Tm) in a screw extruder run at 50 to 300 rpm such that the residence time of the molten material in the screw extruder is less than 5 minutes.

Other known conventional additives may optionally be used in combination with the microporous inorganic fillers herein in the preparation of the novel thermoplastic elastomeric compositions and the novel films formed therefrom. The additional additives, of which one or more may be used, include non-polymeric plasticizers, stabilizers, antioxidants, pro-oxidants, flame retardants, tougheners, epoxy compounds, mold release agents, nucleating agents, colorants, and the like. The additives may be present in any desired amount. Accordingly, the amount of additive utilized will depend upon the particular copolyester and filler used and the application or usage intended for the composition and film. Compositions containing such other additives are within the scope of this invention. It is within the skill of the ordinary artisan in possession of the present disclosure to select the appropriate additive(s) and amount thereof depending on the processing conditions and end use of the composition.

The following examples are intended to be representative of the present invention and many other variations thereof will be recognized by one of skill in the art.

EXAMPLES

General Description of the Synthesis of Polyesters:

The dicarboxylic acids. the glycols, and the catalyst were charged to a 500 ml, single neck, round bottom flask. A Belmont metal bath was preheated to 200° C. and the reaction flask was immersed in the bath. The polyesters were synthesized by a two-step ester interchange process. The first step involved an ester interchange reaction to produce low molecular weight materials, oligomers. The reaction is run at 150–200° C. and the water was continuously distilled off for several hours. The material was stirred at under a nitrogen purge. In the second step, the temperature was raised to about 260–290° C. and polycondensation proceeded with the removal of the excess glycol. The devolatilization of excess glycol was facilitated by applying a vacuum for 1–2 hours.

The following testing procedures are used in determining the properties of the films formed herein.

Coefficient of friction of the films is measured according to ASTM Test Method D1894; Elmendorf tear strength is measured according to ASTM Test Method D1922; elongation is measured according to ASTM Test Method D882; tensile modulus is measured according to ASTM Test Method D882; impact resistance is measured according to ASTM Test Method D882; and tensile strength at yield and tensile strength at break are measured according to ASTM Test Method D882. The inherent viscosity of the film is measured at a temperature of 25° C. for a 0.5 gram sample in 100 mL of a 60/40 parts by weight solution of phenol/tetrachloroethane.

In addition, the moisture vapor transmission rate (MVTR) of the films is measured according to ASTM Test Method E96, procedure D, carried out as follows. The film is tested at 32.2° C.±1° C., and at 50%±2% relative humidity (R.H.), with the environmental conditions being controlled by means of a Thermotron Chamber apparatus. The cup is maintained in an upright position, leaving a space between the water in the cup and the test specimen. Air is continuously circulated over the face of the film at a rate of 200 ft/min. (feet per minute).

The samples of film are stored at 23° C. and 50% relative humidity, prior to testing. The MVTR of 3 specimens from each film are measured. The cups are assembled and placed in a test chamber for 2 hours and then removed therefrom to be accurately weighed to 0.01 g. The cups are again placed in the oven for a total of 24 hours and the weights are measured twice more during the 24 hour period. Each film is analyzed on three separate days to account for day to day differences. The MVTR of each sample is calculated from the equation:

$$MVTR=(g)(t)/(A)(T)$$

wherein:

g=weight change during test (grams)

t=average film thickness to normalize (mil)

A=test area (cup mouth area) (m2)

T=time=1 day

Weight loss versus time data are plotted, and the slope of the line yields the rate of moisture transport through the film. The slope is multiplied by the average film thickness and this product is divided by the area of the test site, thereby resulting in the normalized MVTR. The mean and standard deviation (N=3) of the MVTR of each film are reported.

In all of the examples herein, except for differing types of copolyesters and/or differing amounts and types of microporous inorganic filler utilized, and or drying conditions and extrusion conditions, as noted, the procedure for preparing the thermoplastic elastomer composition containing filler, and the formation of a film therefrom are the same. More particularly, in the examples, an amount of copolyester is dried with dehydrated air at a temperature of 70° C. (158° F.) for a period of about 12 to about 16 hours. The resulting dried pellets of copolyester are fed into a 30 mm (millimeter) Werner-Pfleiderer twin screw extruder at a rate of 21 pounds per hour. Separately fed into the twin screw extruder is dried inorganic filler material, at a rate of 9 pounds per hour. The copolyester and filler are compounded in the twin screw extruder in which the melt temperature in the barrel of the extruder ranges from a temperature of about 150° C. to about 160° C. (about 302° F. to about 320° F.). The resultant melt is then extruded through a rod die and the rod is chopped into pellets having a size of ⅛ (one-eighth) inch. The resultant compounded pellets are dried with dehydrated air at a temperature of 70° C. (158° F.) for a period of about 12 to 16 hours. The dried pellets contain 30 weight percent filler. The concentrate containing 30 weight percent filler can be modified to have any desired decreased level of filler by adding additional copolyester to the concentrate and mixing, for example, by shaking in a bag. The resultant pellets or mixtures having the desired filler concentration are then fed by means of a single feeder into a one-inch Killion single screw extruder operating at about 59–60 rpm (revolutions per minute). The melt temperature of the single screw extruder is about 125° C. and the film is melt cast onto a chill roll set at a temperature of about −5° C. (24° F.). The films obtained from the extruder are of substantially uniform thickness, which can range from about 5 to 10 mils.

Examples 1–4

In these examples, the procedure described hereinabove is used. More particularly, however, the thermoplastic elastomer utilized was a poly(butylene adipate) copolyester containing 43 mole percent terephthalic acid, having an inherent viscosity of 1.10 dl/g. More particularly, the copolyester comprises about 100 mole % butanediol, about 56–59 mole % adipic acid, and about 41–44 mole % terephthalic acid. The copolyester pellets, and the pellets compounded with filler, were each dried with dehydrated air for 16 hours. Compositions and properties of films formed therefrom are reported in Table I.

TABLE I

COMPOSITIONS AND PROPERTIES OF FILMS THEREFROM

| EXAMPLE NO. | 1 | 2 | 3 | 4 | 5 | 6 | 7 |
|---|---|---|---|---|---|---|---|
| Copolyester wt. % | 100 | 90 | 70 | 70 | 91 | 91 | 80 |
| Z 4Å wt. % (a) |  | 10 | 30 |  |  |  |  |
| Z 10Å wt. % (b) |  |  |  | 30 |  |  |  |
| CC wt. % (c) |  |  |  |  | 9 |  |  |
| Talc wt. % |  |  |  |  |  | 9 |  |
| S wt. % (d) |  |  |  |  |  |  | 20 |

(a) Zeolite having pore size of 4 Angstroms and average particle size of 2–3 microns, weight %
(b) Zeolite having pore size of 10 Angstroms and average particle size of 2–3 microns, weight %
(c) Calcium Carbonate, weight percent
(d) Porous Silica, particle size 1–2 microns, weight percent Synthesis of Poly(tetramethylene adipate-co-terephthalate):

The adipic acid, terephthalic acid, 1,4-butanediol, and 100 ppm Ti catalyst were charged to a 500 ml, single neck, round bottom flask. A Belmont metal bath was preheated to 200° C. and the reaction flask was immersed in the bath. The first stage of the two stage process was carried out for 1 hour at 200° C. and 2 hours at 210° C. The molten material was stirred at 200 rpm with a nitrogen purge of 0.3 SCFH. The second stage is polycondensation which was carried out at 265° C. under reduced pressure of <0.3 mm Hg for 1 hour.

From the data reported in Table II the following was observed. The MVTR of a film formed from a thermoplastic elastomeric composition of this invention, containing 10%, by weight, of a microporous inorganic filler was sometimes improved but, in all cases, was not detrimentally affected when compared to the MVTR of a film formed from the same thermoplastic elastomer in the absence of filler. Moreover, as the amount of microporous inorganic filler utilized was increased to 30%, by weight, the MVTR of the films was substantially increased when compared with the film formed from the same thermoplastic elastomer in the absence of filler. Furthermore, the physical properties reported in Table II, other than MVTR, indicate that the films are not deleteriously affected as a result of having incorporated the microporous inorganic filler. Accordingly, the films of the present invention are improved in that, while the physical properties are substantially similar, the MVTR is not decreased and is increased when compared with a film formed from a thermoplastic elastomer in the absence of filler. It is also clear that the breathability and the hand of the film is improved as a result of having incorporated therein the microporous inorganic filler.

TABLE II

| EXAMPLE NO. | 1 | 2 | 3 | 4 | 5 | 6 | 7 |
|---|---|---|---|---|---|---|---|
| MVTR | 592 ± 43 | 566 ± 27 | 1116 ± 74 | 1067 ± 32 | 383 ± 55 | 487 ± 40 | 816 ± 50 |
| TD/MD mPa (a) | 6.6 ± 0.5/7.0 ± 0.7 | 5.7 ± 1.1/5.9 ± 1.3 | 7.4 ± 0.5/9.5 ± 1.3 | 7.5 ± 0.2/4.0 ± 0.8 |  |  |  |
| TD/MD mPa (b) | 9.5 ± 1.0/14.4 ± 1.4 | 10.9 ± 2.2/12.2 ± 3.2 | 9.7 ± 1.1/13.7 ± 1.1 | 6.6 ± 0.3/7.0 ± 1.0 |  |  |  |
| Elongation, % TD/MD | 522 ± 123/599 ± 63 | 645 ± 15/511 ± 167 | 577 ± 54/312 ± 72 | 328 ± 105/575 ± 123 |  |  |  |
| Modulus, mPa TD/MD | 105 ± 53/105 ± 20 | 102 ± 20/107 ± 18 | 190 ± 9/171 ± 13 | 201 ± 34/72 ± 17 |  |  |  |
| IR-FE (c) | 0.21 | 0.23 | 0.5 | 0.33 |  |  |  |
| IR-ML (d) | 11.1 | 9.5 | 21.3 | 18.0 |  |  |  |
| Elmendorf Tear, MD/TD (g/mm) | 21.4/12.3 | 24.3/22.0 | 17.4/14.8 | 11.5/10.2 |  |  |  |
| Coefficient of Friction, Static | NA | 0.56 ± 0.23 | 0.30 ± 0.17 | 0.51 ± 0.20 |  |  |  |

TD = Transverse Direction
MD = Machine Direction

TABLE II-continued

| EXAMPLE NO. | 1 | 2 | 3 | 4 | 5 | 6 | 7 |
|---|---|---|---|---|---|---|---|

(a) Tensile strength at Yield mPa TD/MD
(b) Tensile strength at Break mPa TD/MD
(c) Impact Resistance, Fracture Energy, ft.-lb.
(d) Impact Resistance, Maximum Load, Kg.

Examples 5–7

The procedure of Examples 1–4 was followed in preparing the films of Examples 5–7, with the exception that differing filler materials, other than zeolite materials, were incorporated in preparing the copolyester compositions (see Table I). The MVTR results of films formed from the copolyester compositions are reported in Table II. These examples illustrate the effects upon the MVTR property of a copolyester when utilizing a microporous inorganic silica filler and non-microporous inorganic fillers, such as talc and calcium carbonate.

From the data reported in Table II, it is apparent that a composition comprising a microporous silica filler and a specified copolyester resulted in a continuous, non-porous film formed therefrom having a MVTR increased relative to that of a film formed from the copolyester containing no filler. However, when utilizing a non-microporous filler, (calcium carbonate and talc) with the same copolyester, a film formed from each of the resulting compositions is shown to have a MVTR lower than that of the unfilled copolyester. Moreover, this effect of decreasing the MVTR resulting from utilizing non-microporous inorganic fillers with the copolyester, is noted at a level of filler as low as 9 weight percent.

Examples 8–17

The procedure of Examples 1–4 was followed in preparing the films of Examples 8–17 except for the following. The copolyester of Examples 8 and 9 were dried at a temperature of 70° C. (158° F.) for a period of 12 to 16 hours; the melt temperature in the barrel of the extruder was 250–260° C. (482–500° F.); and the die temperature was 265° C. (509° F.). The copolyesters of Examples 10, 11, 12, 13, 14 and 15 were dried at a temperature of 100° C. (212° F.) for a period of 12–16 hours; the melt temperature in the barrel of the extruder was 170–180° C. (338–356° F.); and the die temperature was 180° C. (356° F.). In each of the Examples, however, 30 weight percent of zeolite having a pore size of 4 Angstroms and an average particle size of 2–3 microns was used, in the examples where microporous inorganic filler was utilized. The MVTR results are obtained according to the procedure defined herein and are reported in Table III. The examples illustrate representative types of copolyesters suitable for use with the present invention.

TABLE III

MVTR OF FILMS PREPARED FROM REPRESENTATIVE COPOLYESTERS

| EXAMPLE NO. | *ELASTOMER, WEIGHT PERCENT | Z 4Åwt % *(a) | MVTR g mil/m2 day |
|---|---|---|---|
| 8 | ECDEL 100% (b) | — | 337 |
| 9 | ECDEL 70% (b) | 30 | 787 |
| 10 | Copolyester 100% (c) | — | 712 |
| 11 | Copolyester 70% (c) | 30 | 1774 |
| 12 | Copolyester 100% (d) | — | 2133 |
| 13 | Copolyester 70% (d) | 30 | 3535 |
| 14 | Copolyester 100% (e) | — | 3360 |
| 15 | Copolyester 70% (e) | 30 | 17888 |
| 16 | Copolyester 100% (f) | — | 535 |
| 17 | Copolyester 70% (f) | 30 | 1517 |
| 18 | Copolyester 100% (g) | 0 | 535 + 56 |
| 19 | Copolyester 70% (g) | 30 | 1517 + 95 |
| 20 | Copolyester 50% (g) | 50 | 1989 + 143 |

*T = Terephthalic acid
I = Isophthalic acid
B = Butanediol
PEG = poly(ethylene glycol)
PPG = poly(propylene glycol)
PTMG = poly(tetramethylene glycol)
(a) Zeolite having pore size of 4 Angstroms and average particle size of 2–3 microns, weight. %
(b) ECDEL
(c) Copolyester of 78 mole % T, 22 mole % I, 83 mole % B, and 17 mole % PTMG
(d) Copolyester of 78 mole % T, 22 mole % I, 16 mole % B, and 31 mole % PEG, and 53 mole % PPG
(e) Copolyester of 78 mole % T, 22 mole % I, 13 mole % B, and 62 mole % PEF, and 25 mole % PPG
(f) Copolyester of poly (butylene adipate) containing 43 mole % T, having an Inherent viscosity of 1.10 dl/g
(g) Copolyester of poly (butylene adipate) containing 43 mole % Terephthalic Acid having an Inherent Viscosity of 1.10 dl/g From the data reported in Table III, it is apparent that films formed from thermoplastic elastomeric compositions comprising 30 weight percent of zeolite and each of five differing copolyesters having the required MVTR, results in the preparation of films having increased MVTR. From these results, it is clear that the breathability of the films would also be increased since MVTR of the films is related to the breathability of the films. Moreover, visual and physical observation of the films reveals enhancement in the hand of the films containing the zeolite filler. In addition, the physical properties of the films are not deleteriously affected as a result of incorporating the microporous inorganic filler.

Following the procedure of Examples 8–17, similar results would be obtained if one were to utilize 30 weight percent zeolite having a pore size of 4 Angstroms and a particle size of 2–3 microns, with a copolyester of poly (butylene adipate) containing 32 mole percent terephthalic acid having an inherent viscosity of 0.98 dl/g, or with a copolyester of poly (hexamethylene glutarate) containing 41 mole percent of 2,6-naphthalenedicarboxylic acid having an inherent viscosity of 0.99 dl/g.

Examples 18–20

Examples 18–20 were carried out following the procedure of Examples 1–4. Examples 18–20 illustrate the increase in the MVTR of films as the amount of microporous inorganic filler, specifically zeolite having a pore size of 4 Angstroms and an average particle size of 2–3 microns, utilized in the examples is increased. The results of the data obtained for Examples 18–20 are reported in Table III.

Examples 21–25

Examples 21–25 were carried out following the procedure of Examples 1–4. These examples are a further showing that continuous, non-porous films formed from thermoplastic copolyester compositions comprising the copolyesters specified herein and microporous inorganic fillers, such as zeolite herein, exhibit MVTR increased relative to that of the copolyester in the absence of the filler. Further, these examples illustrate the increasing MVTR as the amount of zeolite filler is increased. The compositions and MVTR results are reported in Table IV. In addition, the physical properties of the films are not deleteriously affected as a result of having incorporated the microporous inorganic filler material and it is clear that the breathability and the hand will be improved.

TABLE IV

EFFECT OF INCREASING CONTENT OF FILLER ON MVTR OF FILMS

| EXAMPLE NO. | (A) COPOLYESTER WT % | (B) Z4 Å WT % | MVTR G MIL/M2 DAY |
| --- | --- | --- | --- |
| 21 | 100 | — | 524"42 |
| 22 | 90 | 10 | 692"31 |
| 23 | 85 | 15 | 760"25 |
| 24 | 70 | 30 | 1259"113 |
| 25 | 70 | 30 | 1261"84 |

(a) Copolyester of Poly(Butylene Adipate) containing 41–44 mole % Terephthalic Acid having an inherent viscosity of 1.10 dl/g, weight %
(b) Zeolite having pore size of 4 Angstroms and a particle size of 2–3 Microns, weight %.

Examples 26

This Example was prepared following the procedure of Examples 1–4 utilizing the same type of copolyester and the same type of zeolite filler having a pore size of 4 Angstroms and a particle size of 2–3 microns, the difference involving the addition of 5 weight % zeolite. A film was formed from the resulting composition, however, production of the film was very difficult due to sticking to the chill roll (The higher amounts of Zeolite also acts as a chill-roll release agent). Physical voids and holes could have been formed in the film when it was pulled off the chill roll.

According to the ASTM Test Method E96, described hereinbefore, this film had a MVTR of 803+199. This result is not credible, however, since the ASTM Test Method E96 for determining MVTR requires a percent variation less than 20% of the average value to be regarded as a valid determination, and in this instance, the variation was found to be 24.8%. Since the variation of 24.8% is greater than the maximum 20% variation allowable under the test standards of ASTM Test Method E96, the MVTR results observed must be regarded as invalid. The reason for the percent variation exceeding that allowable under the ASTM Test Method E96 is not clear. It is only speculatively stated here that possible explanations for the variability include any one, or more, of the following. There may have been a pin hole in the film sample; the test apparatus may not have been set up properly; the film may have torn during the test; the film may have been of poor quality; and an error in measurements may have occurred. It is emphasized, however, that the cause for the variation in the sample is not known, but it is believed that the poor chill-roll release of the film is the cause. At this low amount of filler an additional chill-roll release agent may be needed.

The neat thermoplastic elastomer film of Example I sticks to the casting rolls as it is extruded making it difficult to produce high quality film. This sticking problem is eliminated by the incorporation of an antiblocking agent such as talc. However, talc reduced the MVTR of the film at levels of about 7 wt %. Therefore, it is disadvantageous to add a material that reduces moisture permeability. Zeolites can also be used as antiblocking agents and at levels about 10 wt % and above have shown to increase MVTR. A film containing about 5 wt % zeolite does not completely eliminate the blocking problem and the film sticks to the casting rolls. The sticking produces poor films with very thin spots. Therefore, the thermoplastic elastoner of Example I with 5 wt % zeolite film showed a high level of variation in the MVTR values most likely due to poor quality film.

While this invention has been described in detail with particular reference to preferred embodiments thereof, it is not so limited, and it should be understood that variations and modifications thereof may be made which are within the spirit and scope of the invention. Moreover, all patents, patent applications (published or unpublished, foreign or domestic), literature references or other publications noted above are incorporated herein by reference for any disclosure pertinent to the practice of this invention.

I claim:

1. A thermoplastic elastomeric composition comprising a thermoplastic elastomer, wherein said elastomer is a thermoplastic copolyester, a film of which has a moisture vapor transmission rate equal to or greater than 200 g mil/m$^2$ day and an effective amount of a microporous inorganic filler such that a film formed from said thermoplastic elastomeric composition has a moisture vapor transmission rate exceeding the moisture vapor transmission rate of a film formed from said thermoplastic elastomer alone.

2. The composition according to claim 1 wherein said microporous inorganic filler is present in an amount of at least 10%, by weight, based on the total weight of said composition.

3. The composition according to claim 1 wherein said microporous inorganic filler is present in an amount of about 25 to about 35%, by weight, based on the total weight of said composition.

4. The composition according to claim 1 wherein said microporous inorganic filler is a zeolite.

5. The composition according to claim 4 wherein said zeolite has an average particle size of about 2 to about 10 microns and a pore size of about 3 to about 10 Angstroms.

6. The composition according to claim 1 wherein said thermoplastic copolyester comprises at least one aliphatic dicarboxylic acid, at least one aromatic dicarboxylic acid and at least one aliphatic diol having from 4 to about 12 carbon atoms.

7. The composition according to claim 6 wherein at least one of said aliphatic dicarboxylic acids is selected from the group consisting of adipic acid, glutaric acid, cyclohexanoic acid, and mixtures thereof; at least one of said aromatic dicarboxylic acids is selected from the group consisting of terephthalic acid, isophthalic acid, naphthalenedicarboxylic acid, and mixtures thereof; and at least one of said aliphatic diols is selected from the group consisting of 1,4-butanediol, cyclohexanedimethanol, a polyalkylene ether compound selected from the group consisting of poly(ethylene glycol), poly(tetramethylene glycol) and poly(propylene glycol), and mixtures thereof.

8. The composition according to claim 7 wherein said polyalkylene ether compound has a number average molecular weight of about 400 to about 1,500.

9. The composition according to claim 1 wherein said copolyester comprises a cyclic aliphatic dicarboxylic acid, a cyclic aliphatic diol having from 4 to about 12 carbon atoms, said cyclic aliphatic diol containing 0 to about 25 mole % of an aliphatic diol having from 2 to 3 carbon atoms, and a polyalkylene ether compound of the formula:

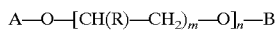

wherein, m is an integer from 1 to 3;

n is an integer from 4 to 250;

R is selected from the group consisting of CH3, C3H7, C2H5, H, and mixtures thereof;

A is hydrogen, or alkyl, acyl, aryl or aroyl moieties having from 1 to 10 carbon atoms; and B is hydrogen, or alkyl, acyl, aryl or aroyl moieties having from 1 to 10 carbon atoms.

10. The composition according to claim 9 wherein said cyclic aliphatic dicarboxylic acid is 1,4-cyclohexanedicarboxylic acid and said cyclic aliphatic diol is 1,4-cyclohexanedimethanol.

11. The composition according to claim 1 wherein said thermoplastic copolyester comprises at least one aromatic dicarboxylic acid, butanediol and a polyalkylene ether compound of the formula:

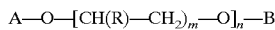

wherein, m is an integer from 1 to 3;

n is an integer from 4 to 250;

R is selected from the group consisting of CH3, C3H7, C2H5, H, and mixtures thereof;

A is hydrogen, or alkyl, acyl, aryl or aroyl moieties having from 1 to 10 carbon atoms; and B is hydrogen, or alkyl, acyl, aryl or aroyl moieties having from 1 to 10 carbon atoms.

12. The composition according to claim 11 wherein at least one of said aromatic dicarboxylic acids is terephthalic acid.

13. The composition according to claim 11 wherein at least one of said aromatic dicarboxylic acids comprises terephthalic acid containing an amount of up to 10 mole % isophthalic acid.

14. The composition according to claim 11 wherein said copolyester comprises poly (butylene naphthalate) containing said polyalkylene ether compound.

15. The composition according to claim 1 wherein said copolyester comprises at least two aliphatic dicarboxylic acids and butanediol.

16. The composition according to claim 15 wherein said copolyester comprises a poly (butylene succinate-co-butylene glutarate).

17. The composition according to claim 15 wherein said copolyester comprises poly (butylene succinate) containing about 20 to about 30 mole percent glutaric acid.

18. The composition according to claim 1 wherein said copolyester comprises an aromatic dicarboxylic acid and at least two aliphatic diols having 4 to 12 carbon atoms.

19. The composition according to claim 18 wherein said copolyester comprises poly (butylene terephthalate) containing 20 to 80 mole % of one of said aliphatic diols.

20. The composition according to claim 18 wherein said copolyester comprises poly (ethylene terephthalate) containing an amount of at least 30 mole % of a polyalkylene ether compound of the formula:

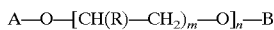

wherein, m is an integer from 1 to 3;

n is an integer from 4 to 250;

R is selected from the group consisting of CH3, C3H7, C2H5, H, and mixtures thereof;

A is hydrogen, or alkyl, acyl, aryl or aroyl moieties having from 1 to 10 carbon atoms; and B is hydrogen, or alkyl, acyl, aryl or aroyl moieties having from 1 to 10 carbon atoms.

21. The composition according to claim 18 wherein said copolyester comprises poly (cyclohexanedimethylene terephthalate) containing an amount of at least 10 mole percent of a polyalkylene ether compound of the formula:

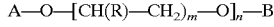

wherein, m is an integer from 1 to 3;

n is an integer from 4 to 250;

R is selected from the group consisting of CH3, C3H7, C2H5, H, and mixtures thereof;

A is hydrogen, or alkyl, acyl, aryl or aroyl moieties having from 1 to 10 carbon atoms; and B is hydrogen, or alkyl, acyl, aryl or aroyl moieties having from 1 to 10 carbon atoms.

22. The composition according to claim 6 wherein said aliphatic dicarboxylic acid has from about 2 to about 12 carbon atoms, said aromatic dicarboxylic acid has from about 8 to about 16 carbon atoms, and said copolyester contains from about 30 to about 70 mole % of said aromatic dicarboxylic acid.

23. The composition according to claim 6 wherein said copolyester comprises a poly (butylene glutarate-co-butylene terephthalate).

24. The composition according to claim 23 wherein said copolyester comprises a poly (butylene glutarate) containing from about 40 to about 60 mole % of terephthalic acid.

25. The composition according to claim 6 wherein said copolyester comprises poly (butylene adipate-co-butylene terephthalate).

26. The composition according to claim 25 wherein said copolyester comprises poly (butylene adipate) containing from about 40 to about 60 mole % of terephthalic acid.

27. The composition according to claim 26 wherein said copolyester comprises poly (butylene adipate) containing 40 to 45 mole % of terephthalic acid.

28. The composition according to claim 27 wherein said copolyester has an inherent viscosity of 1.10 dl/g (deciliters/gram), as measured at a temperature of 25° C. for a 0.5 g sample in 100 mL of a 60/40 parts by weight solution of phenol/tetrachloroethane.

29. The composition according to claim 1 wherein said copolyester has an inherent viscosity of about 0.5 to about 1.8 deciliters/gram (dl/g), as measured at a temperature of 25° C. for a 0.5 g sample in 100 mL of a 60/40 parts by weight solution of phenol/tetrachloroethane.

30. The composition according to claim 1 further comprising at least one additive selected from the group consisting of non-polymeric plasticizers, stabilizers, antioxidants, pro-oxidants, flame retardants, tougheners, epoxy compounds, mold release agents, nucleating agents and colorants.

31. A process for producing a film comprising extruding the composition of claim 1, in liquid form, through an orifice and allowing the composition to solidify forming a continuous, non-porous film.

32. The process according to claim 31 wherein said composition is extruded in the melt being formed into a continuous, non-porous film by melt extrusion.

33. An article of manufacture comprising a film formed from a composition according to claim 1.

34. The article of manufacture according to claim 33 wherein said film is a continuous, non-porous film.

* * * * *